United States Patent Office 3,763,211
Patented Oct. 2, 1973

3,763,211
AMINOPHENOXY BENZONITRILES
Darrell R. Heath and Joseph G. Wirth, Schenectady, N.Y., assignors to General Electric Company
No Drawing. Filed Jan. 20, 1971, Ser. No. 108,153
Int. Cl. C07c 121/78
U.S. Cl. 260—465 E     5 Claims

ABSTRACT OF THE DISCLOSURE

Aminophenoxy benzonitriles are prepared from the reaction of a dinitro-, dichloro- or chloronitro-substituted benzonitrile with an alkali-metal salt of an aminophenol in the presence of a dipolar aprotic solvent. The invention also includes novel diaminophenoxy benzonitriles or benzoic acids prepared in accordance with the above-described process.

This invention is concerned with a process for making aminophenoxy benzonitriles and products derived therefrom. More particularly, the invention relates to a process which comprises effecting reaction in the presence of a dipolar aprotic solvent of a mixture of ingredients comprising (1) a benzenoid compound of the general formula (I) 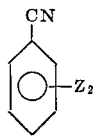

and (2) a compound of the general formula (II) 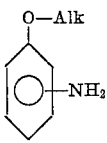

where Z is a member of the class consisting of chlorine and the —$NO_2$ radical, Alk is an alkali metal atom, the Z radical is in the 2,4- or 2,6-position relative to the —CN group and the ——$NH_2$ group is ortho, meta or para to the —O——Alk group, there being employed at least two mols of the alkali metal salt of (2) per mol of benzenoid compound of (1).

The invention is also concerned with diamino compounds of the general formula (III) 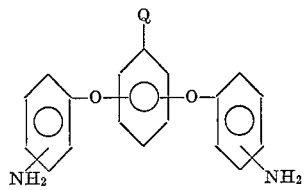

where Q is a member of the class consisting of the
—CN and —COOH radicals the $NH_2$ radical is ortho, meta or para to the neighboring oxygen atom and the

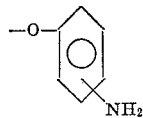

radical is in the 2,4- or 2,6-position relative to the Q radical.

Among the benzenoid compounds of Formula I which may be employed in the practice of the present invention are, for instance, 2,6-dinitrobenzenonitrile,
2,4-dinitrobenzenonitrile,
2,6-dichlorobenzonitrile,
2,4-dichlorobenzonitrile,
2-nitro-6-chlorobenzonitrile,
2-chloro-4-nitrobenzonitrile,
2-nitro-4-chlorobenzonitrile, etc.

Among the aminophenols which may be used to make the alkali metal aminophenate of Formula II may be mentioned, for instance, 2-aminophenol, 3-aminophenol, and 4-aminophenol. The term "Alk" may be sodium, potassium, lithium, etc.

The means whereby the process of the present invention may be practiced can be varied widely. It is essential for optimum yield and desirable rates of reaction to employ at least 2 mols of the alkali metal salt of Formula II per mol of the benzenoid compound of Formula I. Generally, as much as 4 to 8 mols or more of the alkali metal salt may be used per mol of the benzenoid compound.

In making the alkali metal salts of Formula II, it is advantageous to form the alkali metal salt in situ by reacting the corresponding aminophenol and the benzenoid compound in the presence of an alkali metal hydroxide or alkali metal carbonate, such as sodium hydroxide, potassium hydroxide, sodium carbonate, etc. The alkali metal hydroxide or carbonate is added in adequate molar concentration (about 1 mol alkali metal hydroxide or alkali metal carbonate per mol aminophenol) to a reaction mixture composed of the benzenoid compound of Formula I and the precursor aminophenol required to form the alkali metal salt of Formula II. By this action, the alkali metal salt is formed which can then react with the benzenoid compound.

The conditions of reaction whereby the alkali salt of Formula II is reacted with the benzenoid compound of Formula I can be varied widely. Generally, temperatures of the order of about 50–150° C. are advantageously employed, although it is possible to employ lower or higher temperature conditions depending upon the ingredients used, the reaction product sought, time of reaction, solvent employed, etc. In addition to atmospheric pressure, superpressures and subatmospheric pressures may be employed depending upon the other conditions of reaction, the ingredients used, the speed at which it is desired to effect the reaction, etc.

The time of reaction also can be varied widely depending upon the ingredients used, temperature, the desired yield, etc. It has been found that times varying from about 30 minutes to as much as 30 to 40 hours are advantageously employed to obtain the maximum yield. Thereafter, the reaction product can be treated in the manner required to effect precipitation, separation, and purification of the desired diamino compound. Generally, solvents, such as methanol, diethyl ether, water, ethanol, etc., are employed for the purpose.

It is important that the reaction between the benzenoid compound of Formula I and the alkali-metal salt of Formula II (mixtures of such alkali-metal salts can also be used) be carried out in the presence of a dipolar aprotic solvent. The term "dipolar aprotic solvent" is intended to mean any organic solvent which has no active protons which may interfere with the reaction herein described. As will be evident to those skilled in the art, any dipolar aprotic solvent which is capable of dissolving the reactants and causing intimate contact of the reaction ingredients may be used.

Among the preferred aprotic solvents which may be employed in the practice of this invention are non-acid, oxygen-containing, nitrogen-containing organic solvents. These include but are not limited to, for instance, N,N-dimethylacetamide, N-methylpyrrolidone, N,N-dimethylformamide, dimethylsulfoxide, hexamethylphosphoramide, etc.

The amount of solvent used in the reaction mixture may be varied widely. Generally, on a weight basis, one can employ from 0.5 to 50 or more parts of the solvent per part of total weight of the reactants, namely, the benzenoid compound of Formula I and the alkali-metal salt of Formula II. The amount of solvent is not critical, but generally we have found that on a weight basis one can employ from 2 to 20 parts of the solvent per part of the total weight of the benzenoid compound and the alkali-metal salt, whether the later is preformed or prepared in situ.

The fact that diamino compounds could be obtained by reacting the alkali-metal salt of Formula II with a benzenoid compound of Formula I was entirely unexpected and in no way could have been predicted. Thus, it was found that when one attempts to form a compound of Formula III, where Q is the —COOH radical by effecting reaction between an alkali metal salt of Formula II with a dinitro benzoic acid, such as 2,6-dinitrobenzoic acid, no reaction takes place and no aminophenoxy benzoic acid is obtained. However, when a compound of Formula I is used, reaction occurs smoothly to give a product which can be hydrolyzed to the carboxylic acid.

After obtaining the diaminophenoxy benzenoid compound of the formula (IV)

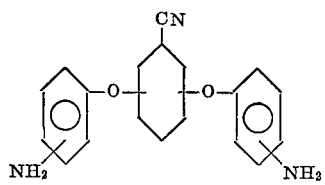

where the NH$_2$— and aminophenoxy groups can be positioned as previously stated, the latter compound can be hydrolyzed in a manner well known in the art to effect hydrolysis of the cyano group to the carboxy group to form a similar general composition as in Formula IV above, except that the cyano group is replaced by a —COOH group.

In order that those skilled in the art may better understand how the present invention may be practiced, the following examples are given by way of illustration and not by way of limitation.

EXAMPLE 1

A mixture of 19.3 grams (0.1 mol) 2,6-dinitrobenzonitrile, 21.8 grams (0.2 mol) 4-aminophenol, 41.5 grams (0.3 mol) potassium carbonate and 200 ml. dry dimethylsulfoxide (DMSO) was stirred under a nitrogen atmosphere at 100–115° C. for 3 hours, the mixture cooled to room temperature and the latter added to water. The solid material which separated out was filtered, washed again with water, and thereafter with 1% sodium hydroxide aqueous solution. The solid product thus obtained was recrystallized from ethanol to give 17.4 grams (about a 55% yield) of light colored needles melting at 211–212° C. This composition was identified as 2,6-di(4-aminophenoxy)-benzonitrile having the formula

V

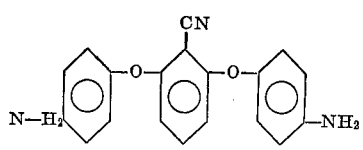

as evidenced by the analyses which were as follows:
Calculated (percent): C, 71.9; H, 4.8; N, 13.2. Found (percent): C, 71.5; H, 4.5; N, 13.2.

EXAMPLE 2

A mixture of 1.93 grams (0.01 mol) 2,4-dinitrobenzonitrile, 2.18 grams (0.02 mol) 4-aminophenol, 2.76 grams (0.02 mol) potassium carbonate, and 20 ml. of dry DMSO was stirred under a nitrogen atmosphere at 75° C. for 24 hours. The mixture was cooled, poured into water, and the product was isolated by filtration. The solid product thus obtained was washed with 1% sodium hydroxide aqueous solution and recrystallized from ethanol to give 2.9 grams (about a 91.5% yield) of light colored needles melting at 193–195° C. This material was identified as being 2,4-di(4-aminophenoxy)benzonitrile having the formula (VI)

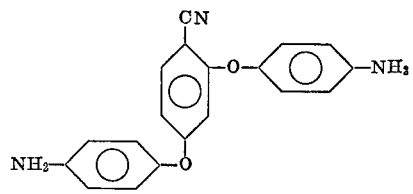

as evidenced by the following analyses:
Calculated (percent): C, 71.9; H, 4.8; N, 13.2. Found (percent): C, 71.5; 4.72; N, 13.3.

EXAMPLE 3

To a mixture of 0.86 gram (0.005 mol) 2,6-dichlorobenzonitrile, 1.09 grams (0.010 mol) 4-aminophenol and 2.76 grams (0.0020 mol) anhydrous potassium carbonate was added 25 ml. DMSO. The resulting suspension was heated in a nitrogen atmosphere with stirring at 120° C. for about 36 hours and thereafter poured into water. The crystalline product which precipitated was removed by filtration and recrystallized from an ethanol-water mixture to give 1.50 grams (about a 95% yield) of 2,6-di-(4-aminophenoxy)benzonitrile. Its identity was established by infrared spectrum comparison with the same compound prepared in Example 1.

EXAMPLE 4

To a mixture of 0.91 gram (0.005 mol) 2-chloro-6-nitrobenzonitrile, 1.09 grams (0.010 mol) 4-aminophenol and 2.76 grams (0.02 mol) anhydrous potassium carbonate was added 25 ml. DMSO. The resulting suspension was heated in a nitrogen atmosphere with stirring for 36 hours at 120° C. and then worked up in essentially the same manner as in Example 3 to give again 2,6-di(4-aminophenoxy)benzonitrile.

EXAMPLE 5

2,6-di - (3 - aminophenoxy)benzonitrile was prepared similarly as in Example 1 except that 3-aminophenol was used in place of the 4-aminophenol used in Example 1. The product was worked up by pouring the reaction product into water, extracting it with diethyl ether and then distilling it at 290° C./0.1 mm. to give the aforesaid 2,6 - di - (3 - aminophenoxy)benzonitrile as a pale yellow liquid which when recrystallized from ethanol-water yielded a white solid melting at 88–90° C. The structure of this product was established by infrared and mass spectra and by the following analyses:
Calculated (percent): C, 71.9; H, 4.8; N, 13.2. Found (percent): C, 72.1; H, 4.8; N, 13.5.

EXAMPLE 6

To a mixture of 0.193 gram (0.001 mol) 2,6-dinitrobenzonitrile, 0.218 gram (0.002 mol) 2-aminophenol and 0.41 gram (0.003 mol) anhydrous potassium carbonate was added 10 ml. DMSO. The resulting suspension was heated with stirring in a nitrogen atmosphere at 50° C. for 12 hours and then poured into water. The crystalline product which precipitated was removed by filtration, and recrystallized from ethanol-water to give 0.280 gram (88% yield) of 2,6-di-(2-aminophenoxy)benzonitrile having a melting point of 167–169° C. The identity of this product was established by the following analyses:

Calculated (percent): C, 71.9; H, 4.8; N, 13.2. Found (percent): C, 72.3; H, 4.7; N, 13.6.

EXAMPLE 7

To a mixture of 2.91 grams (0.005 mol) 2-chloro-6-nitrobenzonitrile, 0.55 gram (0.005 mol) 4-aminophenol and 2.76 grams (0.02 mol) anhydrous potassium carbonate was added 25 ml. DMSO. The resulting suspension was stirred in a nitrogen atmosphere for 2 hours at 50° C. and thereafter 0.55 gram (0.005 mol) 3-aminophenol was added. The temperature was raised to 120° C. and heating was continued for 24 hours. The reaction mixture was then poured into water and worked up in the same way as the product described in Example 6. The recrystallized product from the ethanol-water mixture weighing about 1.20 grams (76% yield) was identified as the compound 2-(4-aminophenoxy)-6-(3-aminophenoxy)benzonitrile melting at 169–171° C. The elemental analyses for this compound were as follows:

Calculated (percent): C, 71.9; H, 4.8; N, 13.2. Found (percent): C, 72.4; H, 4.8; N, 13.7.

EXAMPLE 8

This example illustrates the prepartion of 2,4-di-(4-aminophenoxy)benzoic acid from the precursor diaminocyano compound. More particularly, a 1.58 grams portion (0.005 mol) of 2,4-di-(4-aminophenoxy)benzonitrile was suspended in 100 ml. of a solution containing, by weight, 20 parts potassium hydroxide, 20 parts methanol and 10 parts water. The suspension was heated under reflux until all the benzonitrile dissolved (about 36 hours), and then methanol was removed by means of a solvent stripper. The remaining solution was diluted with water to a volume of 50 ml. Neutralization with concentrated sulfuric acid gave a precipitate which was removed by filtration, weight 1.28 grams (76% yield). The infrared spectrum of the product established that the aforesaid diaminophenoxybenzoic acid was obtained.

Employing the same conditions of hydrolysis as in Example 8, other diaminophenoxybenzoic acids can be obtained. Thus, 2,6-di-(4-aminophenoxy)benzoic acid, 2,6-di-(3-aminophenoxy)benzoic acid, 2,6-di-(2-aminophenoxy)benzoic acid, 2,6-(4-aminophenoxy)-6-(3-aminophenoxy)benzoic acid, etc., can be prepared from the corresponding precursor diaminophenoxybenzonitriles described in the foregoing examples.

The following example illustrates the effect of using a dinitrobenzoic acid reactant with the alkali-metal salt. More particularly, a mixture of 2.12 grams (0.01 mol) 2,6-dinitrobenzoic acid, 1.88 grams (0.02 mol) 4-aminophenol, 4.14 grams (0.03 mol) potassium carbonate, and 20 ml. dry DMSO was stirred under nitrogen atmosphere at 130° C. for 18 hours. The reaction mixture was cooled, diluted with 200 ml. of water, and acidified with hydrochloric acid. A black tarry residue separated from the acidic solution. Analysis of this reaction product by vapor phase chromatography analysis did not detect the presence of any 2,6-di-(4-aminophenoxy)benzoic acid.

The diamino compounds obtained in accordance with the practice of the present invention have many uses. They can be used as intermediates in the preparation of drugs and dyes. In particular, they can be reacted with isophthaloyl chloride or terephthaloyl chloride to form polyamide resinous compositions of the generic formula (VII)

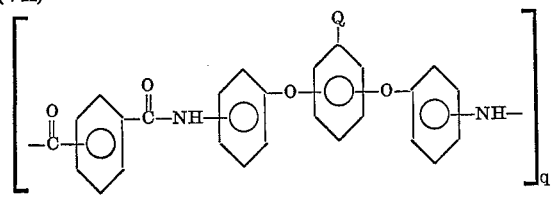

where $q$ is a whole number in excess of 1 and Q has the meaning above. Such polyamides are useful in making films and fibers either by extrusion from a melt or from solution. Such fibers can be spun into various cloths and textiles useful in the apparel art. Films therefrom can be used for packing or other protective purposes.

In addition, the diamino compounds of Formulas III and IV can be reacted with tetracarboxylic acid dianhydrides, such as pyromellitic dianhydride; 3,3',4,4'-diphenyl tetracarboxylic acid dianhydride; 3,4,3',4'-benzophenone tetracarboxylic acid dihydride, etc., to form polyamide acid resins of the generic formula (VIII)

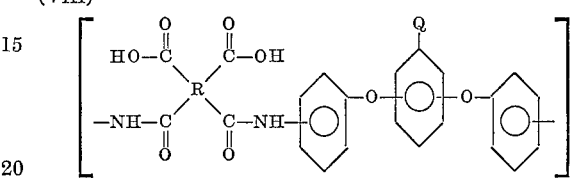

where $r$ is a whole number greatr than 1, R is an organic tetravalent radical containing at least 2 carbon atoms, no more than 2 carbonyl groups of each polyamide acid unit being attached to any one carbon atom of said tetravalent radical, and Q has the meaning above. Such resins can be applied from solution to a variety of substrates, such as metals, glass in the form of sheets, fibers, films, etc.; paper; polyolefins, such as polyethylene, polypropylene, polystyrene, etc. The polyamide acid resins can be heat-treated to convert them to the polyimide state of the general formula (IX)

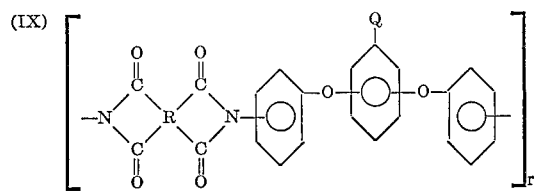

where Q and R have the meanings above, and $r$ is a whole number in excess of 1, resulting in extremely heat resistant fibers, films, and molded products. Such polyimide resins are particularly useful in insulating electrical conductors because of the good heat resistance and the solvent resistance inherent in such polymeric compositions.

Additionally, these diaminophenoxy benzonitriles and the diaminophenoxy benzoic acids can be reacted with trimellitic anhydride to form amide imide compositions which have uses similar to those described above for the polyimide resins.

More specific uses for polyamide acid resins and polyimides obtained therefrom using the diaminophenoxy benzonitriles and diaminophenoxy benzoic acids herein described can be found, for instance, in U.S. Pats. 3,179,-614 and 3,179,634 both issued Apr. 20, 1965, which by reference are made part of the disclosures of the instant application.

The following examples illustrate the manner whereby polymeric compositions can be prepared from the diamino compounds derived from the present invention.

In the following examples, the "Tg" (which stands for the glass transition temperature) of a polymer is defined as the temperature at which the volume versus the temperature curve undergoes a change in slope. In physical terms, this corresponds to the temperature at which the polymer undergoes a change from the glassy state to the rubbery state, i.e., from the brittle to ductile state. In the following examples, the Tg has been determined by differential scanning colarimetry. Further directions for determining the Tg may be found in a discussion by F. W. Billmeyer, Jr., in "Textbook of Polymer Science," Interscience Publishers (1962), pp. 198–204. The term "TGA," which stands for thermogravimetric analysis, is the break-point defined as the temperature at which the rate of weight loss from the sample being heated exceeds 5% per hour at a heating rate of 10° C. per minute. For further description of thermogravimetric analyses, attention is directed to "Techniques and Methods of Polymer Evaluation," vol. 1, Thermal Analysis, by P. E. Slade, Jr. and L. T. Jenkins (editors), published by Marcel Dekker (1966), pp. 87–216.

EXAMPLE 9

A mixture of 4.76 grams (0.015 mole) 2,6-di(4-aminophenoxy)benzonitrile, 3.045 grams (0.03 mol) isophthaloyl chloride, 60 ml. N-methylpyrrolidone (NMP) and 4.5 ml. triethylamine was stirred under a nitrogen atmosphere at 100° C. for 1 hour and then cooled to room temperature. The solution was then added to methanol and the polymer which precipitated was filtered, washed with methanol, dried in vacuum, dissolved in N,N-dimethylformamide (DMF), reprecipitated from methanol and again dried in vacuum to give 4.3 grams (about a 64% yield) of a polymer composed of recurring structural units of the formula

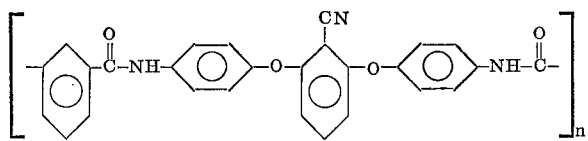

where $n$ is a whole number greater than 1, for instance 2 to 5000 or more. This product had an intrinsic viscosity $$[\eta]^{25°\,C.}\ 0.4\ (\text{in DMF})$$

and a TGA, 385° C. The identity of the polymer was established by the following analyses:

Calculated (percent): C, 72.7; H, 3.8; N, 9.39. Found (percent): C, 70.7; H, 3.8; N, 8.9.

EXAMPLE 10

Another polyamide was prepared by forming a mixture of ingredients of 3.17 grams (0.01 mol) 2,4-di(4-aminophenoxy)benzonitrile, 2.03 grams (0.010 mole) isophthaloyl chloride chloride, 40 ml. NMP, and then stirring the mixture under a nitrogen atmosphere at room temperature (about 25–27° C. while 3 ml. of triethylamine was added. The temperature of the reaction mixture rose to 55° C. and after the exotherm was complete, the stirred mixture was heated to 120° C. and then allowed to cool to room temperature. The solution was added to methanol, and the polymer which was precipitated was isolated by filtration, washed in methanol, and dried in vacuum to give 4.3 grams (about 98% yield) of a polymer composition composed of recurring structural units of the formula (XI)

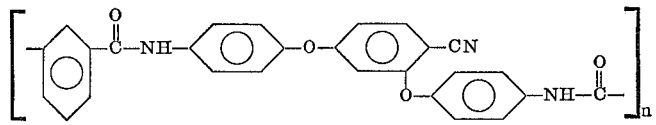

where $n$ is a whole number in excess of one. This polymer had $$[\eta]^{25°\,C.}\ 0.45\ (\text{DMF})$$

a Tg, 237° C.; and a TGA 400° C. The identity of the polymer was established by the following analytical results:

Calculated (percent): C, 72.7; H, 3.8; N, 9.39. Found (percent): C, 69.1; H, 3.8; N, 9.4.

It will of course be apparent to those skilled in the art that other conditions and other ingredients, in addition to those specifically described in the foregoing examples, may be employed without departing from the scope of the invention. Thus, other chloro- or nitrobenzonitriles may be employed with the various alkali-metal salts of Formula II to obtain other derivatives coming within the scope of Formula IV. Other aminophenoxy benzoic acids can also be obtained by hydrolyzing the various aminophenoxy benzonitriles disclosed and taught previously. No intent is to be read into the disclosures or teachings of any limitation as to the process conditions, ingredients used, or products derived subject to the scope of the processes and compositions herein claimed. Accordingly, it should be apparent that the ingredients and proportions of the ingredients used for making the compositions herein described and claimed can be varied widely as illustrated in the various examples which have been given previously.

What we claim as new and desire to secure by Letters Patent of the United States Office is:

1. Diaminophenoxy compounds of the general formula

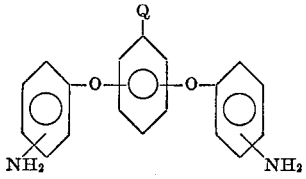

where Q is the —CN radical, the NH$_2$ radical is ortho, meta or para to the neighboring oxygen atom and the

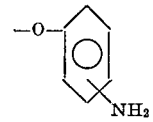

radical is in the 2,4- or 2,6- position relative to the Q radical.

2. The compound 2,6-di(4-aminophenoxy)benzonitrile coming within the scope of the general formula of claim 1.

3. The compound 2,4-di(4-aminophenoxy)benzonitrile coming within the general formula of claim 1.

4. The compound 2,6-di(3-aminophenoxy)benzonitrile coming within the scope of claim 1.

5. The compound 2,6-di-(2-aminophenoxy)benzonitrile coming within the scope of claim 1.

References Cited

UNITED STATES PATENTS 3,489,815  1/1970  Kraus, Jr. ........ 260—465 X

LEWIS GOTTS, Primary Examiner

D. H. TORRENCE, Assistant Examiner

U.S. Cl. X.R.

260—78 R, 519